UNITED STATES PATENT OFFICE.

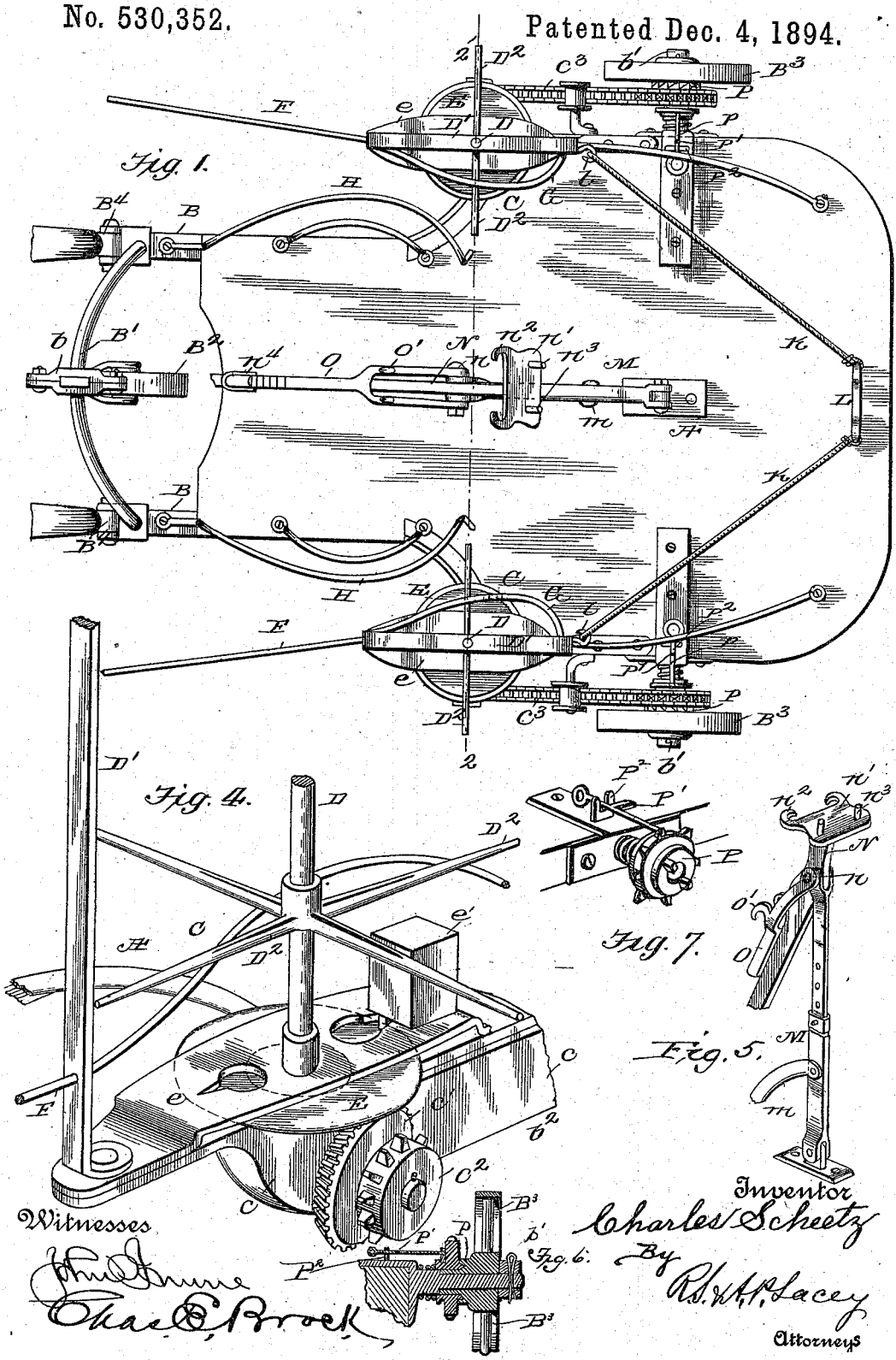

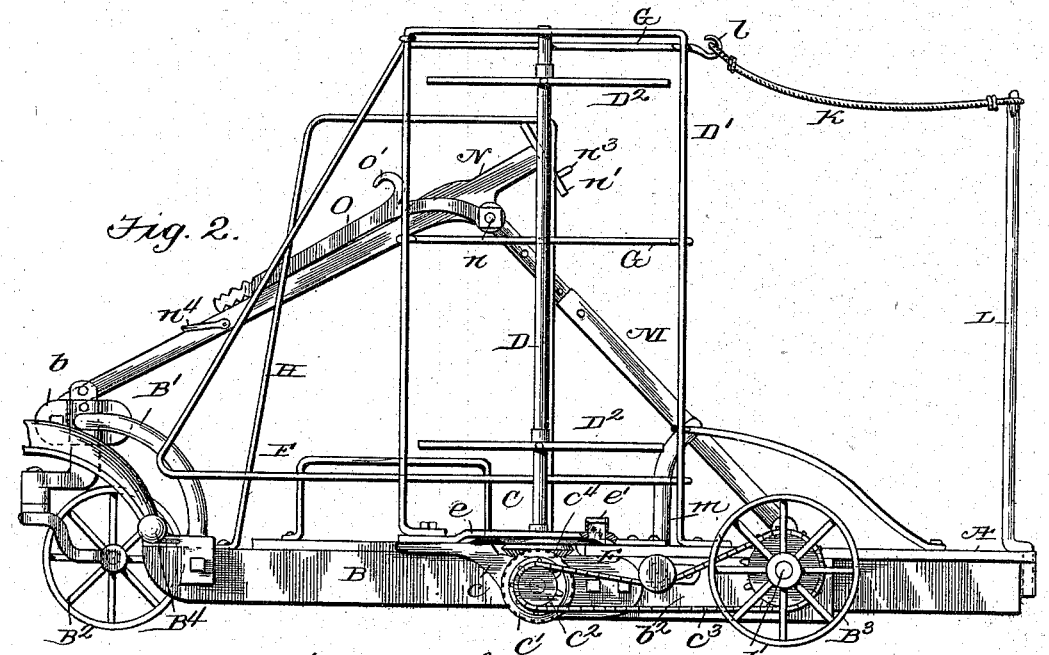

CHARLES SCHEETZ, OF HANOVER, KANSAS.

CORN-HARVESTER.

SPECIFICATION forming part of Letters Patent No. 530,352, dated December 4, 1894.

Application filed April 16, 1894. Serial No. 507,768. (No model.)

*To all whom it may concern:*

Be it known that I, CHARLES SCHEETZ, a citizen of the United States, residing at Hanover, in the county of Washington, State of Kansas, have invented certain new and useful Improvements in Corn-Harvesters; and I do hereby declare the following to be a full, clear, and exact description of the invention, such as will enable others skilled in the art to make and use the same.

This invention relates to an improved corn harvesting, shocking and dropping device.

The object of my invention is to provide a very simple and efficient harvester.

Another object is to provide an improved cutting apparatus and an attachment for keeping the knife sharp, and a further object is to provide an improved mechanism for compressing the shock while being tied, and also means for lifting the shock from the platform and dropping it upon the ground.

With these various objects in view my invention consists in the parts and combination of parts hereinafter fully described and pointed out in the claims.

In the drawings forming a part of this specification Figure 1 is a top plan view of my improved harvester. Fig. 2 is a side elevation. Fig. 3 is a section on the line 2—2 Fig. 1, showing the various positions of the lever in dotted lines. Fig. 4 is a detail view of the cutting mechanism. Fig. 5 is an enlarged view of the compressing and dropping lever. Fig. 6 is a detail view of the clutch locking mechanism. Fig. 7, is a detailed perspective view showing a clutch thrown out and locked in this position, one-half only of said clutch being shown.

In carrying out my invention I employ a platform A mounted upon the longitudinal beams B B, said beams being connected at their forward ends by means of an arched beam B', and connected with the center of said beam B' is a bracket $b$, carrying a caster wheel $B^2$, which supports the forward end of the platform. The rear end is supported by means of wheels $B^3$ mounted upon stub axles $b'$ which are secured to short beams $b^2$ carried by the platform A at each side. The platform is made somewhat narrow at its forward end and to the forward ends of the beams B B are attached the thills $B^4$.

At the forward end of the beams $b^2$ are arranged the cutting mechanisms C C each comprising the bracket $c$ secured to the beam, and on the outer side of said bracket is journaled a beveled gear $c'$ said gear carrying a sprocket $c^2$ connected therewith. This sprocket is driven by means of a chain $c^3$ which in turn is operated by a sprocket mounted upon the axle.

The bevel gear $c'$ meshes with and drives a horizontal bevel gear $c^4$ which is rigidly mounted upon the vertical reel shaft D, the lower end of said shaft being journaled in the bracket $c$ while the upper end of said reel shaft is journaled in the horizontal member of an upright frame, D', secured at each side of the platform. A rotary cutting knife E is also rigidly mounted upon the lower portion of the shaft and extending over said cutter is a guard plate $e$ upon which is mounted a receptacle $e'$ containing a whetstone or other abrading tool. This tool rests upon the cutting edge of the rotary cutter E and as the cutter revolves this tool bearing thereon keeps said cutter sharpened.

Arms $D^2$ are secured to the reel shaft at regular intervals, said arms serving to feed the stalks to the cutting mechanisms. In order to guide the stalks to the cutter I arrange a forwardly projecting guide frame F, which is connected to the frame D' and is formed of stout rod iron or other suitable material. Inwardly curved guard arms G G are also connected with each frame D' and arranged opposite the frames and forward guides are the guide frames H H which in connection with the guard arms and reel serve to hold the stalks upright while being fed to the cutter. After the stalks are severed they are forced back upon the platform where they are still held in an upright position by means of ropes, K K, extending from a rear standard L to the hooks $l\ l$ on the ends of the frame D'. The rear standard L is supported in a socket at the rear end of the platform and the ropes are permanently connected to the top of the same.

Near the center of the platform is pivoted a standard M which is made in sections adjustable upon each other and provided with a leg $m$ to limit its forward movement. The upper end of the standard M is bifurcated and between the members is pivoted a lever N upon a bolt $n$ passing therethrough. At the rear end of this lever N is arranged a flat plate $n'$ at right angles to the lever, said plate having hooks $n^2$ on its upper end, and studs $n^3$ upon its face the purposes of which will appear later on. Another lever O is also pivoted upon the central standard, said lever being forked at $o$ and pivoted upon the bolts $n$ also. Near its rear end the lever is provided with hooks $o'$ and upon the lever N is a bail $n^4$ which is adapted to engage and hold this lever O down upon the lever N. P indicates a clutch upon each axle for throwing the cutting apparatus into and out of gear. This clutch is operated by means of a rod $p$ having an enlargement $p'$, said rod being revoluble in order to turn the enlargement into or out of engagement with a locking plate $p^2$ secured to the edge of the platform.

In operation the machine is drawn forward by one or two horses but when two horses are used they are driven tandem. The stalks are then led into the passages, gathered in by the reels, and cut. They are then forced back upon the platform and held in place by the ropes. When a sufficient quantity has been cut to make a shock, the ropes are detached from the side frames passed beneath the hooks on the plate of lever N and connected with the hooks $o'$ of the lever O. This lever is then thrown down with the effect of compressing the shock. A rope is then tied tightly about the compressed shock and the standard L removed from its socket. The lever N is then moved rearward the studs engaging with the shock and preventing slipping. As the lever moves more rearward the shock is lifted and forced rearward so that it clears the rear standards of the socket, and the entire shock, &c., is deposited upon the ground at the rear of the machine. The ends of the ropes are then detached from the hooks "$o$" of the lever "O."

Having thus described my invention, what I claim, and desire to secure by Letters Patent, is—

1. In a corn harvester, the combination with a platform of the rotary cutter and gearing for driving the same, the ground wheels having clutches, the rod connected therewith having an enlargement, and the slotted plate adapted to engage and hold said rod, substantially as shown and described.

2. In a corn harvester the combination with a platform, of the rear standard having the compressing ropes attached thereto a central pivoted standard, a compressing lever connected therewith and a combined lifting and dropping lever connected also with said central standard, substantially as shown and described.

3. In a corn harvester, the combination with the platform and rear standard, of the compressing ropes, the central standard, compressing lever and lifting and dropping lever connected with said central standard, substantially as shown and described.

In testimony whereof I affix my signature in presence of two witnesses.

CHARLES SCHEETZ.

Witnesses:
JOHN DINGMAN,
EDWARD RINCK.